3,282,944
INTERMEDIATES FOR EMETINE
Thomas Walker, Wembley, England, Rupert Frederick Keith Meredith, Rhondda, Glamorgan, Wales, and Alexander Crawford Ritchie, Harrow, England, assignors to Glaxo Laboratories Limited, Greenford, Middlesex, England, a British company
No Drawing. Original application May 23, 1961, Ser. No. 111,908, now Patent No. 3,105,835, dated Oct. 1, 1963. Divided and this application July 6, 1962, Ser. No. 213,080
Claims priority, application Great Britain, May 27, 1960, 18,899/60
3 Claims. (Cl. 260—287)

This application is a division of Serial No. 111,908, now issued on October 1, 1963, as Patent No. 3,105,835.

This invention concerns novel intermediates for use in the chemical synthesis of emetine and its analogues, and to processes for the preparation of such analogues.

The alkaloid emetine is widely used, particularly in Asia and Africa, to combat amoebic dysentery. A number of synthetic substances have been suggested as substitutes for this naturally occurring compound but none has been found to be more satisfactory in practice. In consequence there exists a demand for a synthetic process leading to emetine which is capable of producing the alkaloid more cheaply than by the present extraction from the natural source. Several synthetic processes have, in fact, been proposed but so far as we are aware, none has proved satisfactory for commercial purposes.

In copending U.S. patent application Serial No. 40,200, we have described compounds and processes for use, inter alia, in the synthesis of emetine and its analogues, one of which processes comprising the reaction of a compound having the skeletal structure

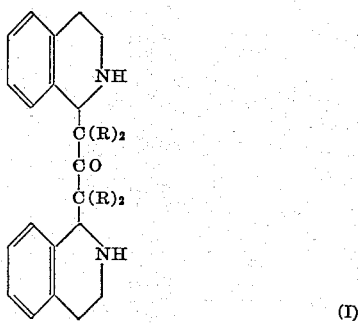

(where groups R represent hydrogen atoms or organic groups which may be the same of different) with a substance able to introduce onto the N-atoms a side chain which can condense with the central carbonyl group to form the 6-membered C ring present in emetine. Two such side chains were exemplified, namely $$-CH_2-CH_2-CO-R^1$$ 

and —CO—CH$_2$—R$^2$ (where R$^1$ and R$^2$ are organic groups). The resulting compound having two identical side chains is then subjected to ring closure, whereupon one only of the chains condenses with the central carbonyl group while the other remains unreacted to protect the N-atom to which it is attached in later stages of the synthesis.

We have now found that a compound having the skeletal structure

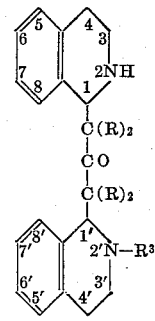

(where R$^3$ represents an inert group as hereinafter defined and R has the above meaning) is in some respects even more convenient as an intermediate in the synthesis of emetine than is the symmetrical compound of structure I above. Where emetine itself is required the group R$^3$ should be removable without affecting the remainder of the molecule and for this purpose an arylmethyl group, preferably a benzyl group is especially suitable.

If, however, the desired final product is an N-substituted emetine analogue, the group R$^3$ may be conveniently either the desired N-substituent or a group which can be converted thereto. Such groupings include alkyl, alkenyl and aralkyl groups, which may if desired carry substituents inert in the various reactions to be outlined below.

The compound II, in order to synthesise emetine or one of its analogues, may then be substituted at the secondary amino group with a side chain which is able to condense with the central carbonyl group, in particular a group —CH$_2$CH$_2$COR$^1$ where R$^1$ represents an organic group, for example an alkyl, aryl, aralkyl group etc.

The group —CH$_2$CH$_2$COR$^1$ may conveniently be introduced by reacting compound II with a vinyl ketone $$CH_2-CH-CO-R^1$$

The reaction proceeds in the absence of a catalyst in a solvent for the reactants.

The cyclisation of the appropriately N-substituted derivatives of compounds of basic structure II may take place under the conditions generally used for condensation of a carbonyl group with a reactive hydrogen atom.

Where the side chain is —CH$_2$—CH$_2$COR$^1$, the cyclisation is preferably carried out in the presence of a basic catalyst. The cyclised product is an alcohol of the general formula

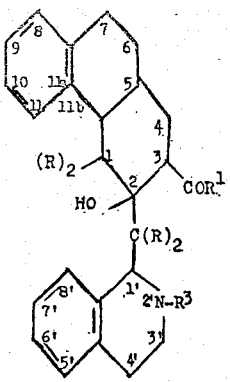

(where R, $R^1$ and $R^3$ have the above meanings). The product is then dehydrated, preferably after isolation. Cyclisation conditions which can be used include, for example alkali metal hydroxides in a water-miscible polar solvent e.g. a lower alcohol, tetrahydrofuran, dioxan etc.; sodium hydride or sodamide suspended in a suitable solvent e.g. benzene, toluene etc.; but the preferred method is an alkali metal alkoxide in the appropriate alcohol advantagously in the presence af an added inert solvent such as a hydrocarbon solvent e.g. benzene, toluene etc. or a chlorinated hydrocarbon solvent e.g. chloroform, methylene chloride etc.

The normal dehydrating agents can be used for the dehydration step e.g. phosphorus oxychloride, thionyl chloride or trifluoroacetic anhydride, in neutral solvents, e.g. benzene etc., or base e.g. pyridine. The preferred method is the use of concentrated (11 N) hydrochloric acid or 11 N sulphuric acid at elevated temperature, usually about 100° C. Lower acid concentrations are less effective.

The dehydrated product possesses the formula

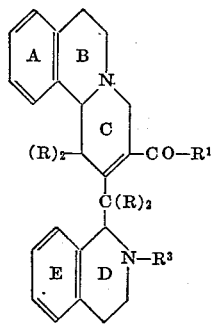

III(1)

(where R, $R^1$ and $R^3$ have the above given meanings) although some material may be formed in which the unsaturation in the O-ring is differently placed.

Where compounds of skeletal Formula III(1) are to be converted into emetine or its analogues, the C-ring unsaturation may be reduced e.g. by reduction with a metal/amine or, preferably, a metal/ammonia reducing system. The metal is advantageously an alkali metal or alkaline earth metal, e.g. sodium, potassium, calcium etc. lithium being, however, preferred. The compound to be reduced may be added to the ammonia or amine solution of the metal in an inert solvent e.g. an ether such as diethyl ether or tetrahydrofuran or a hydrocarbon solvent such as benzene or toluene.

Such reduction generally leads to compounds in which the hydrogen atom introduced at the 2-position is in the $\alpha$- rather than the $\beta$-configuration. We have found that the $\alpha$-isomer can be converted into the $\beta$-isomer, for example by equilibration under strong enolising conditions, e.g. in the presence of concentrated aqueous acid or organic or inorganic base. The acid may, for example, be a mineral acid such as hydrochloric, sulphuric or phosphoric acid while the base may be, for example, an alkali metal hydroxide such as sodium or potassium hydroxide, or a tertiary nitrogen base such as triethylamine.

We have also found that it is the $\beta$-isomer which leads to emetine and its analogues and it is necessary to effect the conversion described above where these compounds are required. Where conditions in any subsequent reactions-steps are strong enolising conditions, however, the separate step of conversion may not be required.

Where compounds are required in which the 3-position side chain is alkyl rather than acyl, the carbonyl group of the acyl group may be reduced, e.g. by reaction with hydrazine and alkali (Wolff-Kishner reaction) or by the action of a metal/acid reducing system (Clemmensen reduction). An alternative method is to convert the carbonyl group into a thioketal group, for example by reaction with ethane di-thiol, and to reduce this for example with Raney nickel or Raney iron, cobalt etc. or with hydrazine and alkali. It should be noted that Wolff-Kishner reaction conditions are often vigorous enough to hydrolyse methoxyl or other ether groups which may be present in the aromatic rings. Such groups may be restored, however, by reaction with appropriate etherifying agents.

Compound II also of use in an alternative route by which emetine may be obtained. In this method group $CO.CH_2$—$R^2$ is attached at the NH group of compound II, e.g. by reaction with an anhydride or acid halide, the resulting side chain then being cyclised, preferably in the presence of a basic catalyst, for example potassium tertiary butoxide. In this case, however, the predominant product is a compound of the formula

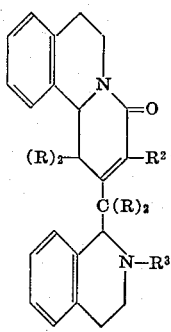

III(2)

(where R, $R^1$ and $R^3$ have the above given meanings) or the $\gamma:\delta$-unsaturated isomer thereof.

Compound III(2) may then be converted to closer analogues of emetine by reduction of the C-ring unsaturation, and reduction of the cyclic amide grouping.

It will be seen that the group $R^3$ must be one which will remain substantially inert in the cyclisation and dehydration and the term inert substituent is used in that sense herein. The nature of $R^3$ is preferably also such that it remains unaffected in such further steps as Wolff-Kishner reduction and metal/ammonia reduction. Preferably $R^3$ should also be removable from the N-atom to which it is attached without disruption of the molecule (since the intermediate II will then be of use in the synthesis of emetine or analogues possessing a free NH grouping) except where it is a substituent of a nature desired in the final molecule.

The compound II may be substituted in the 3,4,5,6,7 and/or 8 position of both the isoquinoline rings by a wide variety of groupings and may thus be used to prepare a large number of emetine analogues. The substituents should of course be inert in the attachment of the side chain to the secondary nitrogen atom and the subsequent cyclisation reaction and will be chosen having regard to the nature of the substituent or substituents present in the alkaloid or other compound it is desired to synthesise. Suitable substituents are thus for example alkyl, aralkyl, aryl, alkoxy, aralkoxy, aryloxy, or tertiary amino groups; e.g. methyl, ethyl, propyl, isopropyl, butyl, amyl, benzyl, phenyl, methoxy, ethoxy, propoxy, butoxy, benzyloxy, phenoxy, or dialkylamino groups. Substituents may also occupy more than one position, as in methylene dioxy groups. In order to prepare emetine itself the 6, 7, 6' and 7' positions only of compound II should carry methoxy groups and the symbols R should represent hydrogen atoms.

Compound II may be prepared in any convenient way. A number of methods are given herein and form part of the present invention.

(1) A compound having the structure

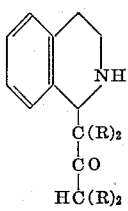

(IV)

may be reacted with an isoquinoline pseudo base having the strucure.

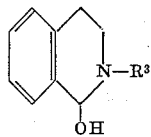

(V)

(where R and R³ have the meanings given above). Preferably the groups R are either all hydrogen atoms or one of the groups R attached to the terminal carbon is a carboxyl group while the other three groups R are hydrogen atoms. In the last-mentioned case, the carboxyl group splits off during the condensation.

Where all the groups R are hydrogen atoms the condensation is advantageously carried out in the presence of an acid or, preferably, a basic catalyst. We prefer to effect the reaction at room temperature in a solvent, such as an alkanol and one suitable system is ethanol containing anhydrous sodium carbonate. Other bases are suitable, however, for example sodium ethoxide, sodium hydroxide, trimethylamine or piperidine but generally give lower yields.

Where one of the terminal groups R is a carboxyl group, however, the terminal hydrogen atom is activated and the condensation will generally take place in the absence of a catalyst. In view of the instability of β-keto carboxylic acids, the reaction is preferably carried out at room temperature or below. The reaction solvent is preferably a lower alkanol, with or without water present, but other polar solvents such as ketones e.g. acetone, MEK etc. ethers such as tetrahydrofuran, dioxan, etc. substituted amides such as dimethylformamide etc. may also be used in the presence or absence of water. Acid or basic catalysts may be present but are not generally required and may reduce rather than increase the yield.

Compound IV may be prepared by reacting a compound of structure

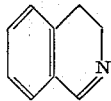

(VI)

with a compound of general formula

CHR₂—COCHR₂     VII (where R has the meanings given above). Preferred compounds of Formula VII are acetone, acetoacetic acid and acetone dicarboxylic acid. Care should be taken that sufficient compound VII is present in the reaction mixture to ensure that a minimal quantity of compound I is formed.

Where all the groups R of compound IV are to be hydrogen atoms, compound VII is conveniently acetone or acetoacetic acid. This reaction may be carried out with an approximately 1:1 mixture of reactants in a basic solution such as pyridine in the case of acetone or merely in water in the case of acetoacetic acid.

Where one of the terminal groups R of compound IV is a carboxyl group, compound VII is conveniently acetone dicarboxylic acid.

The ratio of reactants is advantageously about 1:1 and the reaction is conveniently carried out in aqueous solution in the presence or absence of polar organic solvents e.g. lower alcohols, dioxan etc. The preferred reaction medium comprises aqueous methanol used at or below room temperature.

Compound IV may also be prepared by reacting compound V with compound VII followed by removal of the group R³ although, in general, this is less convenient.

Compound V may be conveniently prepared by quaternising compound VI to form a compound of the structure

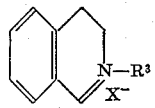

(where R³ has the above meaning and X⁻ is an anion) which may then be reacted with alkali, preferably in the cold, to form the pseudo base.

(2) A compound having the structure

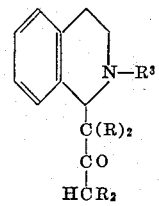

(VIII)

(where R and R³ have the meanings given above), may be reacted with compound VI shown above under substantially the same conditions as are described for the reaction of compounds VI and VII above. Preferably symbols R all represent hydrogen atoms or three represent hydrogen atoms while one of the two groups attached to the terminal carbon atom is a carboxyl group.

Compound VIII may be prepared by reacting compound V with compound VII, under such conditions that only one molecule of V condenses with each molecule of VII. The conditions for carrying out the condensation are similar to those described in (1) above.

In all the reactions described above, the compounds represented by the skeletal structures shown may be substituted with the groupings desired in compound II. In particular, when close analogues of emetine are to be the final products, the 6 and 7 postiion of the isoquinoline moities should carry methoxy groups. Most of the compounds having structures II, III, IV, V and VIII are new compounds and such new compounds form part of the present invention.

When the groups R are all identical, compound II possesses two asymmetric carbon atoms, namely at position 1 and 1¹, and it therefore exists in the form of two pairs of enantiomorphs. In the synthetic processes described, all four isomers of compound II are formed and since only one of these leads to natural emetine or its analogues in the same stereoisomeric series, resolution is required at some stage in the overall synthesis. We have found that in the case where the groups R are all hydrogen and R³ is benzyl, and the 6, 7, 6' and 7' positions carry methoxy groups the racemates may be separated by solubility differences of the salts. One of the racemates, which we have termed isomer A, can be precipitated as its hydrochloride from methanol with ethanolic hydrogen chloride, while the other, isomer B, remains in solution and may be isolated as a sparingly soluble hydrobromide. Resolution of the separated racemates may be effected at this stage or later in the synthesis. We have shown that the present isomer B is in the same stereochemical series as natural emetine.

In order that the invention may be well understood we give the following examples by way of illustration only. All temperatures in °C.

EXAMPLE 1

(a) 2-benzyl-3,4-dihydro-6,7-dimethoxy-isoquinolinium bromide 3,4-dihydro-6,7-dimethoxyisoquinoline (9.0 g.) in sodium-dried benzene (70 ml.) was treated with redistilled benzyl bromide (6.0 ml.; 1.05 mol.) whereupon a partly solid gum separated. After 1 hr., the product had solidified to a yellow powder (13.4 g., M.P. 178–82°) which separated from ethanol in pale yellow tablets (12.5 g.; 73% M.P. 189–91°). Crystallisation from ethanol gave the analytical specimen M.P. 198–200°. Found: C, 60.3; H, 5.5; N, 3.8; Br, 21.9%. $C_{18}H_{20}O_2NBr$ requires C, 59.7; H, 5.5; N, 3.9; Br, 22.1%.

(b) 2-benzyl-1,2,3,4-tetrahydro-1-hydroxy-6,7-dimethoxyisoquinoline (1) A solution of 2-benzyl-3,4-dihydro-6,7-dimethoxy-isoquinolinium bromide (50 g.) in water (1800 ml.) was cooled to 6° and aqueous sodium hydroxide (280 ml., 0.6 N) was added dropwise with stirring over 3 hr. The product was filtered, washed with water and dried in vacuo giving a pale yellow powder (42 g.; 100%) M.P. 107–8°. Crystallisation from benzene-petroleum ether (40–60°) gave the analytical specimen M.P. 111°. Found: C, 72.0; H, 7.1; N, 5.0% $C_{18}H_{21}O_3N$ requires C, 72.2; H, 7.1; N, 4.7%.

(2) 2-benzyl-3,4-dihydro-6,7-dimethoxyisoquinolinium bromide (15.6 g.) was dissolved in aqueous trimethylamine (25% w./v.) (100 mls.) to give a clear yellow solution. When the solution was scratched and allowed to stand at room temperature a fine white precipitate was obtained. After one hour this was removed by filtration washed well with water and dried in vacuo at room temperature. Wt.=11.58 g. (92%) M.P. 112–115° C. (d).

(c) 6,7-dimethoxy-1,2,3,4-tetrahydro-isoquinol-1-yl-acetoacetic acid 6,7-dimethoxy-3,4-dihydroisoquinoline (24 g.) was dissolved in methanol (48 ml.) and water (192 ml.). The mixture was cooled to below room temperature in cold water, and a solution of acetone dicarboxylic acid (18.5 g.) in water 48 ml.) added. After 2½ hr. with continuous cooling and occasional shaking the fine white solid was filtered, washed with water, industrial methylated spirits and finally with ether. After drying in vacuo at room temperature, the product weighed 19.2 g. M.P. 101–3° (decomp.) (Found: C, 60.92– H, 6.56; N, 4.57. $C_{15}H_{19}O_5N$ requires C, 61.42; H, 6.53; N, 4.78%.)

(d) 2-benzyl-6,7-dimethoxy-1(6',7'-dimethoxy-1',2',3',4'-tetrahydro-isoquinol-1'-yl-acetonyl) - 1,2,3,4 - tetrahydroisoquinoline. Isomers A and B (1) 2 - benzyl - 1,2,3,4 - tetrahydro - 1 - hydroxy-6,7-dimethoxyisoquinoline (10.8 g.) was dissolved in industrial methylated spirits (54 ml.) at room temperature. 6,7-dimethoxy-1,2,3,4 - tetrahydroisoquinol-1-yl-acetoacetic acid (9.2 g.) was added and the mixture allowed to stand with occasional shaking. A slow effervescence occurred and the suspension gradually dissolved. After 1½ hr. a little undissolved solid was removed by filtration, and the solution treated with saturated ethanolic hydrogen to pH 1.0 with cooling. After standing overnight in the refrigerator the resultant solid was filtered off, washed with industrial methylated spirits, and dried in vacuo at room temperature to give the hydrochloride of isomer A. Wt.=6.6 g. (30%) M.P. 145–8° (d). (Found: C, 59.80; H, 6.79; N, 3.96; Cl, 10.89 $C_{32}H_{38}O_5N_2 \cdot 2HCl \cdot 2H_2O$ requires C, 60.09 H, 6.93; N, 4.38; Cl. 11.09%.)

Treatment of the filtrate with ether gave an orange yellow gum, which was separated from solvent by decantation and drying in vacuo. This was dissolved in water (200 ml.) and excess ammonium bromide added portionwise with scratching. The pale yellow percipitate was filtered off, treated with industrial methylated spirits and allowed to stand in the refrigerator overnight. The product was filtered, washed with the same solvent followed by ether and dried in vacuo to give the hydrobromide of isomer B. Wt.=4.1 g. M.P. 152–5° (d). (Found: C, 54.91; H, 6.2; N, 4.12; Br. 22.52.

$$C_{32}H_{38}O_5N_2 \cdot 2HBr \cdot 2H_2O$$

requires C, 54.79; H, 5.89; N, 4.0; Br. 22.78%.)

(2) 1-(1,2,3,4-tetrahydro-6,7-dimethoxyisoquinol-1-yl) acetone (1.2 g.) prepared as described in U. S. Patent application Serial No. 40,200 and 2-benzyl-1,2,3,4-tetrahydro-1-hydroxy-6,7-dimethoxyisoquinoline (1.26 g.) were dissolved in 95% ethanol (9.5 ml.) containing anhydrous sodium carbonate (0.025 g.), and the solution was allowed to stand at room temperature for 12 hours then in the refrigerator for 2 days. Water was then added and the mixture was extracted with benzene. The benzene extract was washed with water, dried (MgSO_4), and evaporated to dryness. The resulting oil (2.29 g.) was dissolved in industrial methylated spirits (25 ml.), and ethanolic hydrogen chloride was added to pH 1. The solution was cooled, and crystals (0.53 g., 18%), M.P. 150° of the hydrochloride of isomer A were deposited. Starting material (0.12 g.) was obtained from the mother liquor.

In other experiments, sodium hydroxide, sodium ethoxide, trimethylamine, or piperidine were the catalysts used. The yields varied from 13 to 26%.

EXAMPLE 2

2 - benzyl-1-(6',7'-dimethoxy-2'-(3-keto but-1-yl)-1',2',3',4' - tetrahydro-isoquinol - 1'-acetonyl)-6,7-dimethoxy-1,2,3,4,-tetrahydro-isoquinoline (A series)

The hydrochloride of isomer A prepared in Example 1(b) (3 g.) was dissolved in water and the solution brought to pH 10 with aqueous sodium carbonate solution. The mixture was extracted with benzene (1×20 ml., 2×10 ml.). The first two extracts were combined and washed with water (3×30 ml.) the washes being back-extracted with the third benzene extract. The combined benzene layers after drying (MgSO_4) had a volume of 45 mls.

Methyl vinyl ketone (0.825 ml.) was added and the mixture allowed to stand overnight at room temperature in vacuo to give a pale gummy residue. Addition of ether, followed by removal of the solvent in vacuo gave a pale foam which was not characterised further but was used for the next stage. Wt.=2.78 g.

The process was repeated using the hydrochloride of isomer B prepared in Example 1 and the product used without purification in the next stage.

EXAMPLE 3

3 - acetyl-2-hydroxy-9,10-dimethoxy-2 (2'-benzyl-6',7'-dimethoxy-1',2',3',4' - tetrahydro-isoquinol-1'-yl-methyl)-1,2,3,4,6,7-hexahydro-11b [H]-benzo [a]-quinolizine hydrochloride (A series)

The A series product from the preceding example (2.78 g.) was dissolved in benzene (70 mls.) and sodium methoxide (0.29 g.) in methanol (5.5 mls.) added with mechanical stirring at room temperature. After 15 minutes an equal volume of water was added. The layers were separated and the aqueous phase extracted with benzene (2×25 mls.). The first two extracts were combined and washed with water (3×50 mls.) the washes being back extracted with the third benzene extract. The combined dried (MgSO_4) benzene layers were evaporated to dryness in vacuo at room temperature and ether (ca. 50 mls.) added. After ca. 15 mins. a white solid (66 mg.) separated and was removed by filtration.

The mother liquors were evaporated to dryness and the residue dissolved in industrial methylated spirits (20 mls.). Ethanolic hydrogen chloride was added, with cooling, to pH 1. The pale yellow solution was scratched vigorously and after a few minutes a fine white solid was deposited. The suspension was allowed to stand in the refrigerator overnight when the solid was harvested, washed with industrial methylated spirits and dried at room temperature in vacuo to give the desired hydrochloride. Wt.=1.93 g. (55% from starting hydrochloride) M.P. 198° C. (d). Found: C, 61.24; H, 7.15; N, 3.52; Cl, 9.55. $C_{36}H_{46}O_6N_2Cl_2 \cdot 2H_2O$ requires C, 60.95; H, 7.10; N, 3.95; Cl, 9.99.

$\lambda_{max}$ 229 m$\mu$ (EtOH) $E_{1\,cm.}^{1\%}$=228

The free base had M.P. 148–9°. (Found: C, 71.94; H, 7.25; N, 4.4; $C_{36}H_{44}O_6N_2$ requires C, 71.97; H, 7.38; N, 4.66%.)

The process was repeated with the B series product of Example 3 and the product was isolated at the hydrochloride M.P. 187–9°. (Found: C, 62.61; H, 7.39; N, 3.76; Cl, 10.0. $C_{36}H_{46}O_6N_2Cl_2 \cdot H_2O$ requires C, 62.51; H, 7.0; N, 4.05; Cl, 10.2%.) The free base had M.P. 178–9°. (Found: C, 71.93; H, 7.61; N, 4.46; $C_{36}H_{44}O_6N_2$ requires C, 71.97; H, 7.38; N, 4.66%.)

EXAMPLE 4

3 - acetyl - 9,10-dimethoxy-2(2'-benzyl-6',7'-dimethoxy-1', 2',3',4' - tetrahydroisoquinol - 1' - yl-methyl)-1,4,6,7-tetrahydro 11b [H]-benzo [a]-quinolizine The A series hydrochloride prepared in Example 3 (1 g.) was dissolved in water and adjusted to pH 10 with aqueous sodium carbonate. The mixture was extracted with benzene (3×10 mls.). The first two extracts were combined and washed with water (3×25 mls.), the washes being back extracted with the third benzene extract. The solvent was removed from the combined, dried (MgSO₄) benzene extract and the residual gum heated on the steam bath with 11 N sulphuric acid (20 mls.) under nitrogen for 2½ hours. The pale yellow solution was cooled and adjusted with sodium hydroxide to pH 6. and then with aqueous sodium carbonate to pH 10. Before neutralisation had been achieved an orange gum separated which did not dissolve either in excess alkali or in benzene (20 mls.) which was now added. The solvent layers were decanted and the gum dissolved in methanol, diluted with water, and poured into the water/benzene mixture when it was not re-precipitated. The layers were separated and the aqueous phase extracted with benzene (2×20 mls.). The benzene (2×20 mls.). The benzene layers were washed with water (3×25 mls.) in the usual way and dried (MgSO₄). Removal of the benzene in vacuo at room temperature, followed by evaporation of the residue with ether gave a pale pink foam. Addition of ether and scratching gave a pale crystalline solid. This was filtered off, washed with ether and dried in vacuo at room temperature to give the desired product. Wt.=0.44 g. (53 g.) M.P. 145–6° C.

$\lambda_{max}$ 231.5 m$\mu$ (EtOH+HCl) $E_{1\,cm.}^{1\%}$=375

Found: C, 73.19; H, 7.20; N, 4.50%. $C_{36}H_{42}O_5N_2 \cdot \frac{1}{2}H_2O$ requires C, 73.07; H, 7.32; N, 4.74%. I.R. carbonyl stretching frequency 1678 cm.$^{-1}$.

The process was repeated using the B series isomer prepared in Example 3 and the product was isolated as the free base M.P. 132–133.5°. Found: C, 73.96; H. 6.97; N, 4.6. $C_{36}H_{42}O_5N_2$ requires C, 74.19; H, 7.27; N, 4.81%.

EXAMPLE 5

2-benzyl-3,4-dihydro-6,7-dimethoxy-isoquinolinium bromide 3,4-dihydro-6,7-dimethoxyisoquinoline (50 g.) was dissolved in industrial methylated spirits (250 ml.) and benzyl bromide (33.5 ml.) added portionwise with cooling at room temperature. The mixture was seeded and scratched, and after 1½ hr., the quaternary bromide was filtered off, washed with a little industrial methylated spirits and dried in vacuo at room temperature.

Wt.=43.7 g. M.P. 192–5°.

A second crop (9.67 g.) was obtained by the addition of petroleum ether (B.P. 60–80°) to the mother liquors.

EXAMPLE 6

3 - acetyl - 1,2,3,4,6,7 - hexahydro - 9,10 - dimethoxy-2 - (2 - benzyl - 1,2,3,4 - tetrahydro - 6,7 - dimethoxyisoquinol - 1 - yl - methyl) - 11b[H]-benzo[a]quinolizine

A SERIES

Calcium metal (1.6 g.) was added to liquid ammonia (300 ml.) and the mixture stirred under reflux for 30 min. The conjugated ketone (A series) obtained in Example 3 (10 g.) in a mixture of benzene (50 ml.) and ether (100 ml.) was added over about 3 min. to the reaction mixture with vigorous stirring. After 10 mins. excess metal was destroyed by the addition of acetone, and the ammonia removed by evaporation. Water (100 ml.) and benzene (50 ml.) were added and the mixture filtered through kieselguhr. The layers were separated, and the aqueous phase extracted with further portions of beneze (2×50 ml.). The benzene extracts were washed with water, the solvent removed in vacuo, and the residue triturated with ether (30 ml.). The crude solid obtained was dissolved in 11 N-sulphuric acid and heated in the steam bath under nitrogen for 2 hr. After cooling, and basification with potassium carbonate, the mixture was extracted with benzene, the extracts being washed with water in the usual way. Distillation of the solvent and crystallisation of the residue from ether gave the desired saturated ketone, M.P. 107–109° C. (Found: C, 73.7; H, 7.8; N, 4.7. $C_{36}H_{44}O_5N_2$ requires C, 73.9; H, 7.6; N, 4.8%). The hydrochloride gave prisms from methanol-ether, M.P. 206–208° C. (d). (Found: C, 62.0; H, 7.3; N, 3.9; Cl, 9.7. $C_{36}H_{44}O_5N_2 \cdot 2HCl \cdot 2H_2O$ requires C, 62.3; H, 7.3; N, 4.0; Cl. 10.2%.)

B SERIES

The conjugated ketone (B series) obtained in Example 3 (2.57 g.) in dry tetrahydrofuran (140 ml.) was added to a stirred solution of lithium (0.315 g.) in liquid ammonia (approx. 400 ml.) and the mixture stirred at the boiling point for 30 min. The excess metal was destroyed by the addition of acetone, and the crude product isolated with benzene as in the previous example. The crude product, after partial purification on a Florisil column, was heated on the steam bath overnight in 2 N-hydrochloric acid to effect equilibration, and the product isolated as before with benzene. Crystallisation from ether gave the desired saturated ketone M.P. 142.5–144° C. (Found: C, 72.5; H, 7.6; N, 4.4. $C_{36}H_{44}O_5N_2 \cdot 2H_2O$ requires C, 72.8; H, 7.6; N, 4.7%.)

The hydriodide gave pale yellow crystals from water. (Found: C, 49.5; H, 6.1; N, 2.9; I. 28.8.

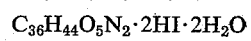
$C_{36}H_{44}O_5N_2 \cdot 2HI \cdot 2H_2O$ requires C, 49.3; H, 5.75; N, 3.2; I, 29.0%.)

The perchlorate crystallised from water, M.P. 180–181° C. (Found: C, 52.25; H, 6.2; Cl, 8.2. $C_{36}H_{44}O_5N_2 \cdot 2HClO_4 \cdot 2H_2O$ requires C, 52.6; H, 6.1; Cl, 8.6%.)

EXAMPLE 6

Preparation of thioketals

A SERIES

The saturated ketone (A series) obtained in Example 5 (0.9 g.) was suspended in anhydrous methanol (18 ml.) and saturated with dry hydrogen chloride at 0° C. Ethane dithiol (0.9 ml.) was added, and the passage of gas continued for a further 2 hr. at 0° C. After standing overnight at room temperature, the methanol was removed by distillation in vacuo, water and benzene added, and the mixture neutralised to pH 10 with aqueous sodium carbonate. The free base was isolated with benzene in the usual way, and then isolated as the hydrochloride by treatment with 2 N-hydrochloric acid. After crystallisation from alcohol, the hydrochloride had M.P. 205–208° C. (Found: C, 57.1; H, 7.2; N, 3.3; Cl, 8.9; S, 8.2.

$$C_{38}H_{48}O_4N_2S_2 \cdot 2HCl \cdot 3 \cdot 5H_2O$$

requires C, 57.3; H, 7.2; N, 3.5; Cl, 8.9; S, 8.05%.)

*Thioketal*

B SERIES

The saturated ketone (B series) obtained in Example 5 was converted into the thioketal by the above procedure. The product was isolated as the hydrobromide from ethanol-ether, M.P. 212° C. (Found: C, 52.35; H, 6.3; N, 3.1; S, 7.5; Br, 18.0. $C_{38}H_{48}O_4N_2S_2 \cdot HBr \cdot 3H_2O$ requires C, 52.1; H, 6.4; N, 3.2; S, 7.3; Br. 18.2%.)

EXAMPLE 7

*Preparation of N-benzylisoemetine*

The thioketal (A series) obtained in Example 6 (0.41 g.) in xylene (30 ml.) was refluxed with vigorous stirring with Raney nickel (W4; approx. 6 g.) for 16 hr. The nickel was filtered from the cooled reaction mixture, washed with benzene, and the combined filtrate and washings washed with 2 N-sodium hydroxide and water. Removal of the solvent gave a crude foam whose solution in 2 N-hydrochloric acid, on treatment with excess aqueous potassium iodide solution, gave N-benzylisoemetine hydriodide, M.P. 198–202° C.

EXAMPLE 8

*Preparation of N-benzylemetine*

The thioketal (B series) obtained in Example 6 (0.85 g.) was heated in refluxing xylene (50 ml.) with Raney nickel (W4; 6.0 g.) for 24 hours. The crude free base, isolated as before, was purified by chromatography on alumina (25 g.; grade H; 10% ethyl acetate-benzene) to give (+) N-benzylemetine as a froth.

The hydrobromide, crystallised from ethanol, had M.P. 211–213° C. (d) (Found: C, 55.3; H, 6.7; N, 3.6; Br, 19.7. $C_{36}H_{46}N_2O_4 \cdot 2HBr \cdot 3H_2O$ requires C, 55.0; H, 6.9; N, 3.6; Br, 20.3%.)

EXAMPLE 9

*Preparation of isoemetine*

N-benzylisoemetine obtained in Example 6 (0.5 g.) was dissolved in water (50 ml.) containing 2N-hydrochloric acid (10 ml.) and added to a pre-reduced suspension of 10% palladium-charcoal catalyst (0.6 g.) in water (50 ml.) containing 2 N-hydrochloric acid (2.5 ml.). The mixture was shaken with hydrogen at atmospheric pressure and room temperature for 18 hr., when the catalyst was removed by filtration and washed with water. Basification of the aqueous filtrate with sodium carbonate and extraction with ether gave (±) isoemetine as a pale froth, identical (infrared and paper chromatography) with an authentic sample. The hydrochloride, crystallised from methanol-ether had M.P. 254–6° C. (Found: C, 59.2; H, 8.0: N, 4.4; Cl. 12.2. $C_{29}H_{40}N_2O_4 \cdot 2HCl \cdot 2H_2O$ requires C, 59.1; H, 8.2; N, 4.75; Cl, 12.0%.)

EXAMPLE 10

*Preparation of (±) emetine*

Catalytic hydrogenation of (±) N-benzylemetine (0.29 g.) with 10% palladium-charcoal catalyst in dilute hydrochloric acid solution, and isolation of the product as above gave (±) emetine, isolated as the hydrobromide (0.12 g.), M.P. 228–232° C. (d) (Found: C, 50.1; H, 6.9; N, 4.1; Br, 22.3. $C_{29}H_{40}O_4N_2 \cdot 2HBr \cdot 3H_2O$ requires C, 50.0; H, 6.95; N, 4.0; Br, 22.9%).

The infrared spectrum (bromoform) and $R_F$ value of this product were identical with those of the hydrobromide of natural emetine.

We claim:

1. A compound of the formula where R is lower alkoxy and $R^1$ is lower alkyl.

2. A compound of the formula where R is lower alkoxy and $R^1$ is lower alkyl.

3. A compound of the formula where R is lower alkoxy, $R^1$ is lower alkyl and X is selected from the group consisting of oxygen and ethylene thioketal.

References Cited by the Examiner

UNITED STATES PATENTS 3,045,021   7/1962   Brossi _____ 260—289
3,121,720   2/1964   Barton et al. _____ 260—288

ALEX MAZEL, *Primary Examiner.*

IRVING MARCUS, NICHOLAS S. RIZZO, *Examiners.*

D. M. KERR, D. G. DAUS, *Assistant Examiners.*